US010992201B2

(12) United States Patent
Calebrese et al.

(10) Patent No.: US 10,992,201 B2
(45) Date of Patent: Apr. 27, 2021

(54) ELECTRICAL PROPULSION SYSTEM WITH CORONA SUPPRESSION ON A VEHICLE

(71) Applicant: General Electric Company, Schenectady, NY (US)

(72) Inventors: Christopher Michael Calebrese, Colonie, NY (US); Jeffrey Sullivan, Niskayuna, NY (US); Lili Zhang, Niskayuna, NY (US); Qin Chen, Niskayuna, NY (US); Konrad Weeber, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 765 days.

(21) Appl. No.: 15/670,584

(22) Filed: Aug. 7, 2017

(65) Prior Publication Data

US 2019/0044405 A1    Feb. 7, 2019

(51) Int. Cl.
*H02K 3/40* (2006.01)
*H02K 3/34* (2006.01)
(Continued)

(52) U.S. Cl.
CPC ............ *H02K 3/40* (2013.01); *B64D 27/24* (2013.01); *H02K 3/04* (2013.01); *H02K 3/345* (2013.01);
(Continued)

(58) Field of Classification Search
CPC .. H02K 3/04; H02K 3/12; H02K 3/22; H02K 3/24; H02K 3/30; H02K 3/32; H02K 3/34;
(Continued)

(56) References Cited

U.S. PATENT DOCUMENTS 3,471,695 A    10/1969  Hudson et al.
4,176,334 A    11/1979  Buritz et al.
(Continued)

FOREIGN PATENT DOCUMENTS

CN    201191517 Y    2/2009
CN    101958585 A    1/2011
(Continued)

OTHER PUBLICATIONS

Xie et al., "Corona Suppression by a Semiconductor Coating in High Voltage Insulation Systems", EIC 6th Electrical/Electronical Insulation Conference, Oct. 3-6, 1983.
(Continued)

*Primary Examiner* — Alex Torres-Rivera
*Assistant Examiner* — David A. Singh
(74) *Attorney, Agent, or Firm* — McGarry Bair PC

(57) ABSTRACT

An electrical machine of a vehicle electrical propulsion system includes a stator, a rotor, and a stator winding all disposed within a housing thereof. The stator defines a central bore elongated along a longitudinal axis, and multiple slots circumferentially disposed around the central bore. The rotor is held within the central bore and rotates relative to the stator. The stator winding includes a core conductor, an insulation layer surrounding the core conductor, and a conductive shield layer surrounding the insulation layer. The stator winding extends through the slots of the stator. The stator winding includes an in-slot portion within the slots of the stator and an end-winding portion outside of the slots. The conductive shield layer surrounds the insulation layer along both the in-slot portion and the end-winding portion of the stator winding.

21 Claims, 7 Drawing Sheets

(51) Int. Cl.
*H02K 3/04* (2006.01)
*B64D 27/24* (2006.01)
*H02K 21/16* (2006.01)
*H02K 15/10* (2006.01)
*H02K 7/18* (2006.01)

(52) U.S. Cl.
CPC ........... *H02K 21/16* (2013.01); *H02K 7/1823* (2013.01); *H02K 15/10* (2013.01)

(58) Field of Classification Search
CPC ............ H02K 3/345; H02K 3/40; H02K 7/18; H02K 7/1807; H02K 7/1823; H02K 11/01; H02K 11/012; H02K 11/0141; H02K 15/10; H02K 15/105; H02K 15/14; H02K 21/26; B64D 27/00; B64D 27/24; B64D 27/26; Y10T 29/49; Y10T 29/49002; Y10T 29/49009; Y10T 29/4902; Y10T 29/49071; Y10T 29/49073
USPC .......................................................... 310/196
See application file for complete search history.

(56) References Cited

U.S. PATENT DOCUMENTS

| | | | | |
|---|---|---|---|---|
| 4,487,996 | A | | 12/1984 | Rabinowitz et al. |
| 4,991,774 | A | | 2/1991 | Kelly |
| 2,712,603 | A | | 7/1995 | Bridges et al. |
| 5,633,477 | A | | 5/1997 | Smith et al. |
| 5,923,232 | A | | 7/1999 | Eurpoa et al. |
| 6,056,995 | A | | 5/2000 | Hake et al. |
| 6,140,733 | A | * | 10/2000 | Wedde ................... H02K 3/345 310/196 |
| 6,242,825 | B1 | * | 6/2001 | Mori ........................ H02K 3/30 174/127 |
| 7,634,852 | B2 | | 12/2009 | Sternberg et al. |
| 8,410,784 | B1 | | 4/2013 | Brown et al. |
| 2011/0012467 | A1 | * | 1/2011 | Blissenbach ............. H02K 3/28 310/195 |
| 2011/0062816 | A1 | * | 3/2011 | Emery ...................... H02K 3/40 310/196 |
| 2011/0072641 | A1 | | 3/2011 | Baumann |
| 2015/0042195 | A1 | | 2/2015 | Brockschmidt et al. |
| 2016/0028276 | A1 | | 1/2016 | Raminosoa et al. |
| 2017/0214284 | A1 | * | 7/2017 | Fries ........................ H02K 3/24 |

FOREIGN PATENT DOCUMENTS

| | | |
|---|---|---|
| CN | 102484406 A | 5/2012 |
| CN | 102306919 B | 6/2015 |

OTHER PUBLICATIONS

El-Kishky et al., "Experience with Development and Evaluation of Corona-Suppression Systems for HV Rotating Machines", IEEE Transactions on Dielectrics and Electrical Insulation, vol. 9, Issue 4, pp. 569-576, Aug. 2002.

Wang et al., "Electric Field Evaluation of ±400kV Converter Quadrivalve Corona Shields in High Altitude Area", IEEE Conference on Electrical Insulation and Dielectric Phenomena (CEIDP), Oct. 19-22, 2014.

Pokryvailo et al., "Comparative Testing of Shield Terminations of High Voltage Cables", IEEE International Power Modulators and High Voltage Conference; May 2008; 4 pages.

Emery, "Partial Discharge, Dissipation Factor, and Corona Aspects for High Voltage Electric Generator Stator Bars and Windings", IEEE International Power Modulators and High Voltage Conference;; vol. 12, Issue 2; Apr. 2005; pp. 347-361.

Chinese Office Action for corresponding Chinese Application No. 2018109072431 dated Oct. 12, 2020 (6 pages).

* cited by examiner

ELECTRICAL PROPULSION SYSTEM WITH CORONA SUPPRESSION ON A VEHICLE

FIELD

The subject matter described herein relates to propulsion systems on vehicles, such as aircrafts, space crafts, automobiles, rail vehicles, marine vessels, or the like.

BACKGROUND

A corona discharge is an electrical discharge caused by the ionization of a gas, such as air, surrounding a conductor. Corona discharge occurs when the local electric field exceeds a threshold value. The threshold value is dependent on various conditions, such as distances between conductive elements separated by the gas and the electric field strength (e.g., the size of the potential gradient), the electrical breakdown strength of the gas, and the frequency and ramp rate of the electric field. For example, if an insulation layer surrounding a conductor is exposed to air and is subjected to an electrical potential drop that exceeds the electrical breakdown strength of air at the ambient conditions, then a corona discharge may occur across the insulation layer between the conductor and a grounded conductive element spaced apart from the insulation layer. The corona discharge can degrade the insulation layer, reducing the usable lifetime of the insulation layer, and can also generate ozone that is detrimental to other components in the system.

In aviation applications, lower air pressure at altitude (relative to air pressure at ground level) reduces the electrical breakdown strength of the air. The reduced electrical breakdown strength of the air increases the risk for corona discharge. Conventional electrical machines (generators and/or motors) in aircraft attempt to prevent corona discharge by increasing the clearance distances between adjacent conductive elements and also by limiting the voltages to below an upper limit. Some known aircraft use 400 Vac or 540 Vdc as the upper voltage limit, such that the electrical systems of the aircraft are limited to receiving current at less than or equal to 400 Vac or 540 Vdc.

However, the conventional aircraft electrical systems have several drawbacks. For example, setting the upper voltage limit at 400 Vac or 540 Vdc may significantly restrict the performance capabilities and/or efficiencies of an electrical distribution system on the aircraft designed to operate at voltages up to or exceeding 1 kV. Even without the upper voltage limit in place, in order to avoid corona discharge at high working voltages up to or exceeding 1 kV, the clearance distances between the conductors and grounded electrical elements would need to be sufficiently large that the electrical equipment, such as electrical machines, would be impracticably large and heavy. Larger and heavier electrical machines in an aircraft are undesirable and impractical due to the resulting increase in fuel consumption to support the flight of the aircraft relative to smaller and/or lighter aircrafts (flown in similar environmental conditions and at similar flight settings).

SUMMARY

In one or more embodiments of the present disclosure, an electrical machine of a vehicle electrical propulsion system is provided that includes a housing, a stator, a rotor, and a stator winding. The stator is within the housing, and has an annular shape that defines a central bore elongated along a longitudinal axis of the stator. The stator defines slots circumferentially disposed around the central bore. The rotor is held within the central bore of the stator. The rotor is coupled to a shaft that extends along the longitudinal axis of the stator. The rotor is configured to rotate relative to the stator around the longitudinal axis. The stator winding extends through the slots of the stator within the housing. The stator winding includes a core conductor, an insulation layer surrounding the core conductor, and a conductive shield layer surrounding the insulation layer. The stator winding includes an in-slot portion within the slots of the stator and an end-winding portion outside of the slots. The conductive shield layer surrounds the insulation layer of the stator winding along both the in-slot portion and the end-winding portion of the stator winding.

In one or more embodiments of the present disclosure, a propulsion system of a vehicle is provided that includes an engine and an electrical propulsion system operably coupled to the engine. The electrical propulsion system includes an electrical machine. The electrical machine includes a housing, a stator, a rotor, and a stator winding. The stator is within the housing, and has an annular shape that defines a central bore elongated along a longitudinal axis of the stator. The stator defines slots circumferentially disposed around the central bore. The rotor is held within the central bore of the stator. The rotor is coupled to a shaft that extends along the longitudinal axis of the stator. The rotor is configured to rotate relative to the stator around the longitudinal axis. The stator winding extends through the slots of the stator within the housing. The stator winding includes a core conductor, an insulation layer surrounding the core conductor, and a conductive shield layer surrounding the insulation layer. The stator winding includes an in-slot portion within the slots of the stator and an end-winding portion outside of the slots. The conductive shield layer surrounds the insulation layer of the stator winding along both the in-slot portion and the end-winding portion of the stator winding.

In one or more embodiments of the present disclosure, a method of assembling an electrical machine of a vehicle electrical propulsion system is provided that includes providing a stator within a housing. The stator has an annular shape that defines a central bore elongated along a longitudinal axis of the stator. The stator defines slots circumferentially disposed around the central bore. The method includes inserting a stator winding into the slots of the stator within the housing. The stator winding includes a core conductor and an insulation layer surrounding the core conductor. The stator winding has an in-slot portion within the slots of the stator and an end-winding portion outside of the slots. The method also includes applying a conductive shield layer that surrounds the insulation layer of the stator winding. The conductive shield layer is applied along both the in-slot portion and the end-winding portion of the stator winding.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
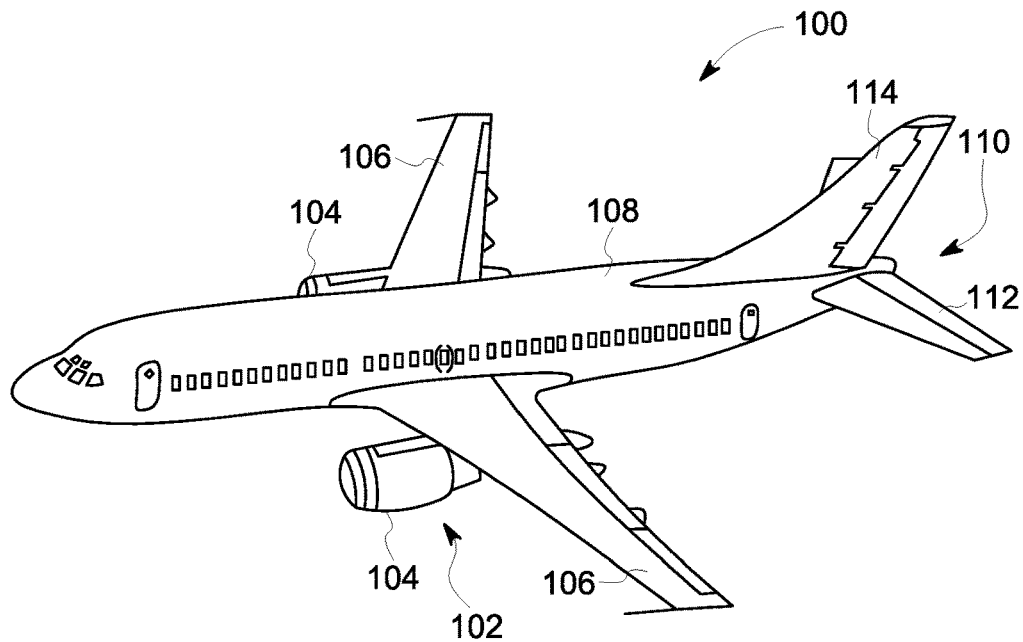
FIG. 1 illustrates a side perspective view of an aircraft according to an embodiment.

Embodiments of the inventive subject matter described herein provide an electrical propulsion system for a vehicle that is configured to operate at high voltages while suppressing corona discharge. The vehicle may be an aircraft, and the electrical propulsion system is configured to suppress corona discharge at high altitudes. The electrical propulsion system generates electric current and distributes the electric current to power various loads on the aircraft. For example, the electrical propulsion system may provide high voltage electric current to a motor that drives the propeller to produce thrust for propelling the vehicle. The high voltage electric current may be used for powering other loads as well, such as for raising landing gears and operating flaps on the wings of the aircraft. The electrical propulsion system in the embodiments described herein may operate at high voltages exceeding 300 V, such as up to or exceeding 1 kV. Although the vehicle in one or more embodiments described herein is an aircraft, it is recognized that the electrical propulsion system may be installed on another type of vehicle, such as a space craft, an automobile, a marine vessel, a rail vehicle (e.g., a locomotive), or the like.

In one or more embodiments of the present disclosure, the electrical propulsion system includes an electrical machine, such as a generator and/or a motor, that includes a stator and a rotor within a housing. The electrical machine is designed to suppress corona discharge by shielding all components within the housing that could be susceptible to corona, such as the insulation on the stator winding (e.g., also known as coil or bar winding), cooling pipes, conductor joints at interfaces between the stator winding, and cooling junctions at interfaces between the stator winding and the cooling pipes. In one or more embodiments, an entire length of the stator winding within the housing of the electrical machine is surrounded by a shield layer that is applied directly on the insulation layer of the stator winding. For example, the shield layer surrounds the stator winding along in-slot portions within the stator, along end-winding portions outside of the stator, and along the junctions or connection interfaces connecting different segments of the stator winding and connecting the stator winding to cooling pipes.

The electrical machine is referred to herein as "fully shielded" because the shielding layer surrounds all components susceptible to corona within the housing. This fully shielded design is configured to eliminate electric fields in the air that is within the housing. As a result, the electric stress in the air outside of the shield layer is sufficiently small to prevent discharge. The solid insulation sustains the electrical potential drop between the high voltage conductive core and the shield layer. The solid insulation can withstand a greater electric field than air and is also not affected by air pressure changes at altitude.

The electrical machine described above is electrically connected via power cables to other electrical devices and electrical machines in the electrical propulsion system, such as power converters, circuit breakers, energy storage devices, generators, motors, and the like. The other electrical devices and electrical machines may also be fully shielded to suppress corona discharge. Furthermore, the power cables connecting the electrical machines and electrical devices of the electrical propulsion system also include shield layers surrounding insulation layers of the power cables. Therefore, the entire electrical propulsion system may be configured to suppress corona discharge while operating at high voltages.

At least one technical effect of the subject matter described herein includes providing an electrical machine in a vehicle that is able to operate at higher voltages (e.g., exceeding 300 V) than known vehicle-based electrical machines, especially at high altitudes encountered by aircraft. For example, the electrical machine enables a greater power density (e.g., power-to-weight ratio) than known vehicle electrical machines because the electrical machine maintains an existing machine size and clearance distances between conductive components. Thus, the size and weight of the electrical machine are not required to increase in order to allow the electrical machine to operate at the high voltages at high altitudes. Yet another technical effect of the subject matter described herein includes reducing the degradation of electrical insulation, and therefore extending the lifetime of the insulation, by reducing the possibility of corona discharge along the electrical insulation. For example, surface corona along the insulation is generally eliminated.

FIG. 1 illustrates a side perspective view of an aircraft 100 according to an embodiment. The aircraft 100 includes a propulsion system 102 that provides thrust to propel the aircraft 100. The propulsion system 102 includes two gas turbine engines 104 in the illustrated embodiment, but the propulsion system 102 may include more than two engines 104 or only one engine 104 in alternative embodiments. The engines 104 are carried by wings 106 of the aircraft 100. In other embodiments, the engines 104 may be carried by a fuselage 108 and/or an empennage 110 of the aircraft 100. The empennage 110 includes horizontal stabilizers 112 and a vertical stabilizer 114. The fuselage 108 of the aircraft 100 defines an interior cabin, which may include a cockpit, one or more work sections (for example, galleys, personnel carry-on baggage areas, and the like), one or more passenger sections (for example, first class, business class, and economy sections), and an aft section. In an alternative embodiment, the propulsion system 102 may include one or more propellers.

Figure 2:
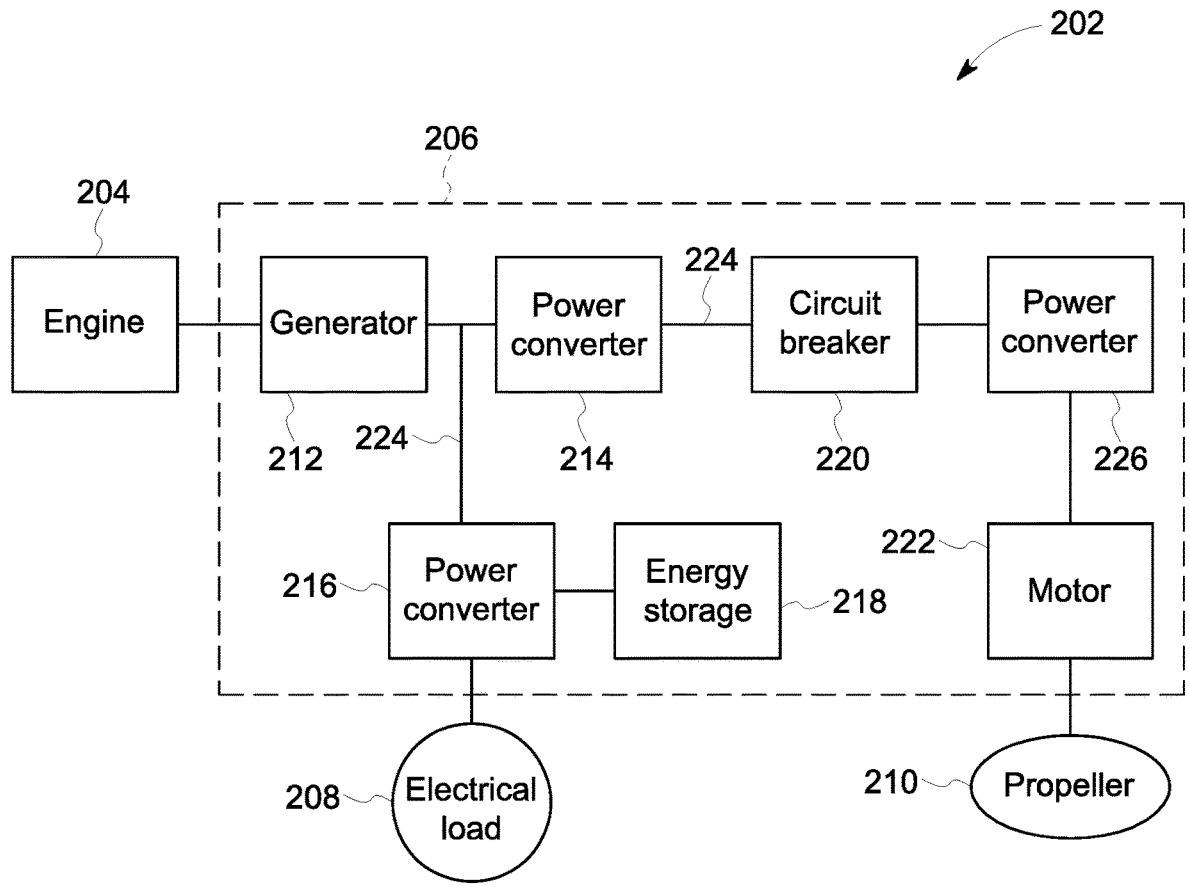
FIG. 2 is a schematic diagram of a propulsion system of an aircraft according to an embodiment.

FIG. 2 is a schematic diagram of a propulsion system 202 of a vehicle according to an embodiment. The propulsion system 202 may be the propulsion system 102 of the aircraft 100 shown in FIG. 1. The propulsion system 202 includes an engine 204, an electrical propulsion system 206, an electrical load 208, and a propeller 210. The electrical propulsion system 206 includes various electrical machines and electrical devices operably coupled between the engine 204 and the loads, such as the electrical load 208, the propeller 210, and other mechanical loads. In an embodiment, the engine 204 is a gas turbine engine 204 that is configured to generate mechanical power via the chemical combustion of fuel and air. The electrical propulsion system 206 converts the mechanical power received from the gas turbine engine 204 to electrical power in the form of electric current, and then modifies and distributes the electrical power.

The electrical propulsion system 206 includes a generator 212, a first power converter 214, a second power converter 216, an energy storage device 218, a circuit breaker 220, a third power converter 226, and a motor 222. The generator 212 is operably coupled to the gas turbine engine 204 and is configured to convert the mechanical power received from the engine 204 to electrical power. The electric current from the generator 212 is directed along electrical power cables 224 from the generator 212 to the first and second power converters 214, 216. In an embodiment, the generator 212 is configured to supply high voltage electric current to the power converters 214, 216, such as over 300 V.

The first and second power converters 214, 216 are configured to modify the electrical power received from the generator 212, such as by converting the electrical power between alternating current (AC) and direct current (DC) and/or changing the voltage or frequency of the electrical energy. For example, the power converter 216 may supply relatively low voltage, such as at 128 V or the like, to the electrical load 208. Each of the power converters 214, 216 may include or represent one or more transformers and/or similar devices. The current from the second power converter 216 is supplied to the energy storage device 218, which may include or represent one or more batteries. The current from the first power converter 214 is supplied to the circuit breaker 220. The circuit breaker 220 is configured to break the conductive circuit path in the event that the voltage or current exceeds a designated threshold to prevent damage to the devices and machines in the system 206. Optionally, the first power converter 214 may be configured to step up or increase the voltage of the electric current that is supplied to the circuit breaker 220.

The power converter 216 supplies current via a power cable 224 to the electrical load 208, which may represent multiple electrical loads. Non-limiting examples of the electrical load 208 may include an HVAC system, an oven in the galley, lighting, instruments for the operator (e.g., pilot, driver, or the like), and in-vehicle entertainment for passengers.

The third power converter 226 may include or represent one or more transformers and/or similar devices. The third power converter 226 receives current from the circuit breaker 220 and supplies power to one or more electrical loads, including the motor 222. The third power converter 226 may be configured to decrease or step down the voltage of the electric current, such that a low voltage electric current is supplied to the motor 222. The electric voltage may be greater than 300 V, such as up to or exceeding 1 kV.

The motor 222 is configured to convert the electrical power received from the power converter 226 to mechanical power that is used to rotate the propeller 210. The rotation of the propeller 210 may generate thrust for sustaining flight of the aircraft. Although only one motor 222 and one propeller 210 are shown in FIG. 2, the propulsion system 202 of the aircraft may include multiple propellers 210 powered by multiple corresponding motors 222. In an embodiment, the motor 222, or other motors (not shown) of the electrical propulsion system 206, may be configured to power other mechanical loads on the aircraft, such as raising and lowering the landing gears, modifying positions of adjustable flaps on the wings of the aircraft, and the like. Powering the motor 222 to rotate the propeller 210 requires a greater voltage than powering the electrical load 208, so the power converter 216 decreases the voltage that is supplied to the load 208 relative to the voltage that the power converter 226 supplies to the motor 222.

In an embodiment, all of the current-carrying components of the electrical propulsion system 206, such as the power cables 224 extending between the devices and machines, stator windings in the generator 212 and the motor 222, and the like, are electrically shielded. For example, the power cables 224 and the stator windings may include the same or a similar conductive shield layer applied directly on respective insulation layers. Therefore, corona discharge is suppressed along the entire system 206, even at high altitudes and high voltages.

Although the electrical propulsion system 206 shown in FIG. 2 is configured for use in an aircraft that includes a propeller 210 and a gas turbine engine 204, the electrical propulsion system 206 may be installed in another type of vehicle in other embodiments, such as an automobile, a marine vessel, a space craft, a rail vehicle, or the like. For example, instead of a gas turbine engine, the electrical propulsion system 206 may be operably connected to an internal combustion engine mounted onboard an automobile, or another type of engine.

Figure 3:
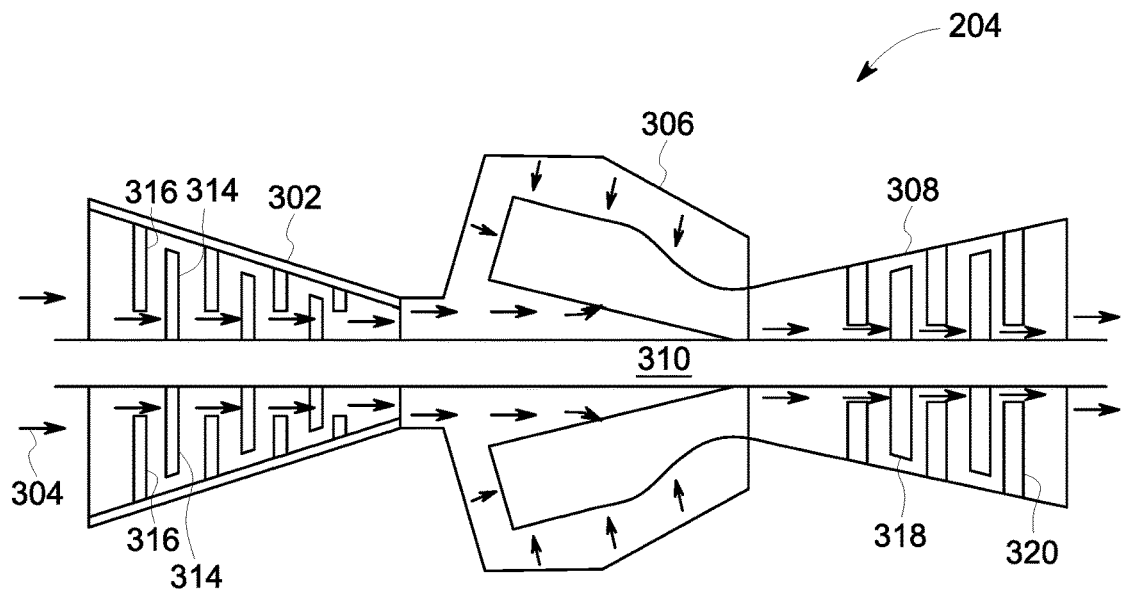
FIG. 3 is a cross-sectional illustration of a gas turbine engine of the propulsion system according to an embodiment.

FIG. 3 is a cross-sectional illustration of the gas turbine engine 204 in accordance with one embodiment. The gas turbine engine 204 includes a compressor 302 that receives incoming air in the direction of arrow 304. The air traveling through the compressor 302 is compressed to increase the pressure of the air. The compressor 302 has multiple airfoils including rotor blades 314 and guide vanes 316. The blades 314 are axially offset from the guide vanes 316 in the direction 304. The guide vanes 316 are stationary components, while the blades 314 are coupled to and rotate with a drive shaft 310 of the engine 204.

The air exiting the compressor 302 is directed to a combustor 306, where the compressed air is burned with fuel. The reaction products from the combustion reaction exit the combustor 306 in the direction 304 and enter a turbine 308. The turbine 308 is mechanically coupled to the drive shaft 310, which extends through the combustor 306 and at least partially through the compressor 302. The turbine 308 has multiple airfoils including rotor blades 318 and guide vanes 320. The blades 318 are axially offset from the guide vanes 320 in the direction 304. The guide vanes 320 are stationary components, while the blades 318 are coupled to and rotate with the drive shaft 310. For example, the reaction products from the combustor 306 force the rotor blades 318 of the turbine 308 to rotate, which powers the rotation of the compressor 302 via the drive shaft 310. The reaction products exiting the turbine 308 are discharged from the engine 204 as exhaust gases. Although not shown in FIG. 3, the engine 204 may include a case or nacelle that holds the compressor 302, the combustor 306, and the turbine 308 in fixed axial positions.

Figure 4:
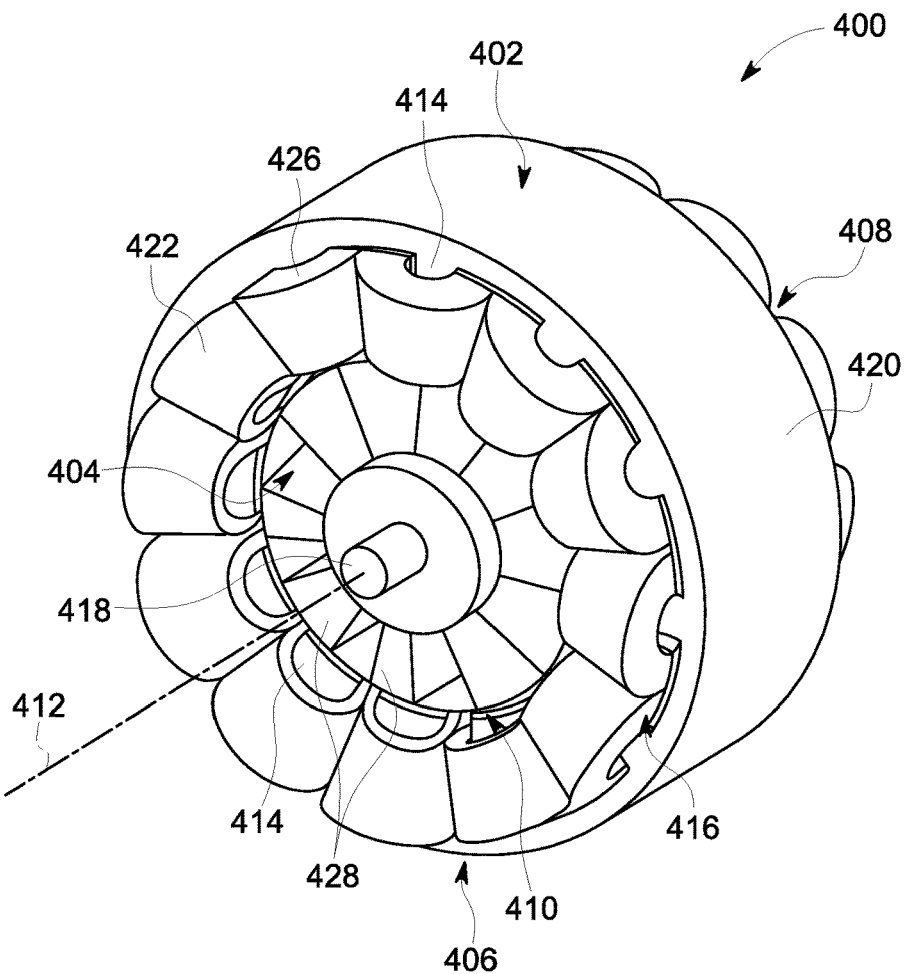
FIG. 4 is a front perspective view of an electrical machine of the propulsion system according to an embodiment.
Figure 5:
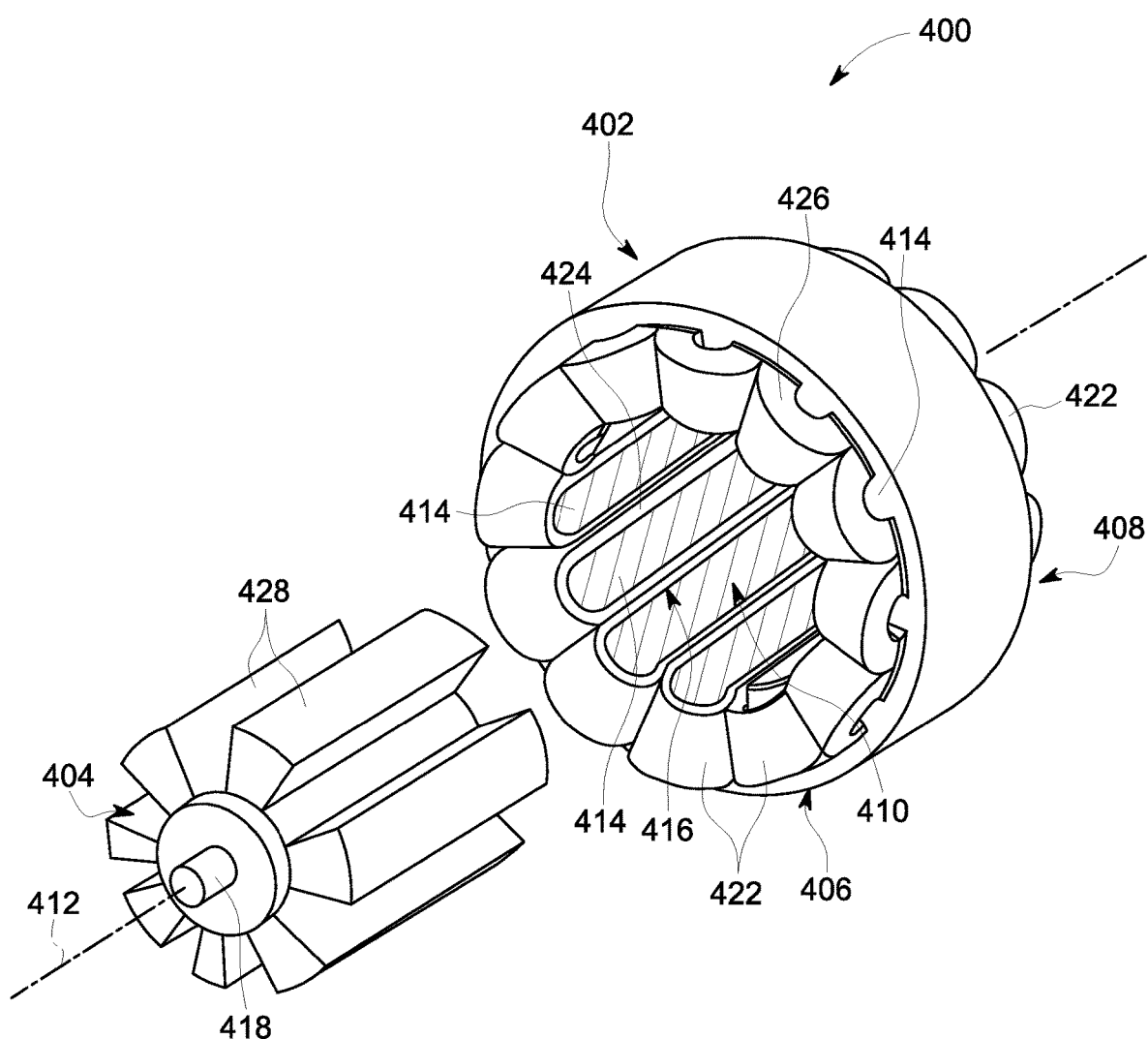
FIG. 5 is an exploded perspective view of the electrical machine shown in FIG. 4.

FIG. 4 is a front perspective view of an electrical machine 400 according to an embodiment. FIG. 5 is an exploded perspective view of the electrical machine 400 shown in FIG. 4. The electrical machine 400 may be the generator 212 or the motor 222 of the electrical propulsion system 206 shown in FIG. 2. The electrical machine 400 includes a stator 402 and a rotor 404, which are substantially concentric.

With reference to both FIGS. 4 and 5, the stator 402 has a front 406 and a rear 408. The stator 402 has an annular shape that defines a central bore 410 extending through the stator 402 between the front 406 and the rear 408. The central bore 410 is elongated along a longitudinal axis 412. The stator 402 defines slots 416 that extend through the stator 402 from the front 406 to the rear 408. The slots 416 are disposed circumferentially around the central bore 410, and are located radially outward of the central bore 410. The slots 416 may extend parallel to the longitudinal axis 412. In an embodiment, the portions of the stator 402 between adjacent slots 416 are referred to as slot walls 414. In an embodiment, the stator 402 includes an outer case 420. The slot walls 414 are connected to the outer case 420 and extend radially inward from the outer case 420 towards the axis 412. The slot walls 414 may be integral to the outer case 420, such that the slot walls 414 and the outer case 420 are formed during a common manufacturing process. Optionally, the outer case 420 and the slot walls 414 are not formed as a single, solid machined piece, but instead are comprised of a plurality of stator laminations that are stacked axially and pressed together to form the stator 402.

The stator 402 includes a conductive stator winding 422 that winds through the slots 416. The stator winding 422 may be defined by one or more coils or bars. For example, multiple bars may be electrically connected to assemble the stator winding 422. The stator winding 422 extends continuously through each of the slots 416. A portion of the stator winding 422 within the slots 416 of the stator 402 (e.g., located axially between the front 406 and the rear 408) is referred to as an in-slot portion 424. A portion of the stator winding 422 located axially outside of the stator 402 is referred to as an end-winding portion 426. The end-winding portion 426 includes looped or C-shaped segments of the stator winding 422 that extend between two slots 416.

The rotor 404 is held within the central bore 410 of the stator 402. The rotor 404 is coupled to a shaft 418 that extends along the longitudinal axis 412. The rotor 404 and the shaft 418 are configured to rotate together relative to the stator 402. The rotor 404 and the shaft 418 rotate around or about the longitudinal axis 412. The rotor 404 includes rotor teeth 428 disposed along a circumference of the rotor 404.

The electrical machine 400 may include one or more permanent magnets on the rotor 404. For example, the rotor teeth 428 may include or retain permanent magnets. Alternatively, the stator 402 may include permanent magnets between adjacent slots 416.

During operation of the electrical machine 400, the shaft 418 and the rotor 404 rotate around the longitudinal axis relative to the stator 402. Depending on whether the electrical machine 400 is the generator 212 or the motor 222 (shown in FIG. 2), electric current in the stator winding 422 will either be induced by or cause the rotation of the rotor 404. For example, if the electrical machine 400 is the generator 212, work applied to the shaft 412 can rotate the rotor 404, inducing electric current flow in the stator winding 422. For example, the shaft 412 may be mechanically coupled to the drive shaft 310 (shown in FIG. 3) of the gas turbine engine 204 via a mechanical linkage (e.g., a gear set or the like). When the drive shaft 310 is rotated by the force of the reaction products in the engine 204, the shaft 412 is also forced to rotate.

If, on the other hand, the electrical machine 400 is the motor 222, current injected into the stator winding 422 can induce a magnetic field that rotates the rotor 404 and the shaft 412. The shaft 412 may be mechanically coupled to the propeller 210 via a mechanical linkage, such that rotation of the shaft 412 causes the propeller 210 to rotate.

Figure 6:
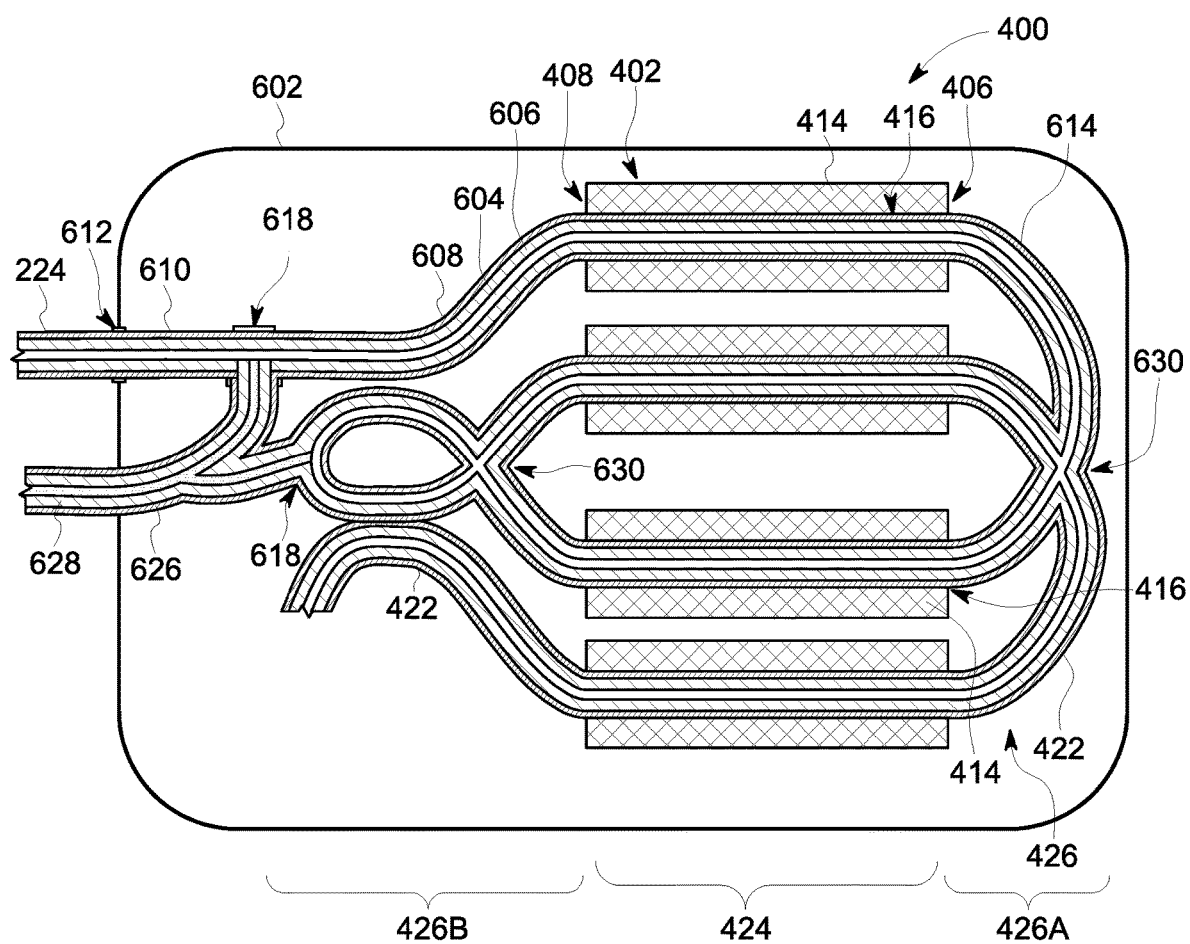
FIG. 6 is a schematic diagram of a portion of the electrical machine according to an embodiment showing a stator within a housing of the electrical machine.

FIG. 6 is a schematic diagram showing a portion of the electrical machine 400 according to one embodiment. FIG. 6 shows the stator 402 within a housing 602 of the electrical machine 400, but does not show the rotor 404 or the shaft 412 (shown in FIG. 5). The housing 602 provides mechanical support to the stator 402 and the rotor 404. The housing 602 may, but does not necessarily need to, form a complete enclosure around the stator 402 and rotor 404. The housing 602 is composed of one or more metals or metallic components, such that the housing 602 is electrically conductive. The housing 602 in an embodiment is grounded (e.g., at a ground potential) within the aircraft.

The in-slot portion 424 of the stator winding 422 extends through the slots 416, and the end-winding portion 426 of the stator winding 422 is outside of the slots 416. Both the in-slot portion 424 and the end-winding portion 426 of the stator winding 422 are disposed within the housing 602. The end-winding portion 426 includes a front sub-section 426A that protrudes beyond the front 406 of the stator 402 and a rear sub-section 426B that protrudes beyond the rear 408 of the stator 402. The stator winding 422 along the end-winding portion 426 is curved to extend between different slots 416. The stator winding 422 further includes an exit segment 610 that extends through an opening 612 in the housing 602 to exit the housing 602. The opening 612 may be a motor terminal. Although not shown, the stator winding 422 also has a second exit segment 610 that exits the housing 602.

The stator winding 422 includes a core conductor 604, an insulation layer 606 surrounding the core conductor 604, and a conductive shield layer 608 surrounding the insulation layer 606. The core conductor 604 is composed of one or more electrical conductors. In an embodiment, the core conductor 604 is configured to conduct high voltage electric current, such as voltage up to or exceeding 1 kV. The insulation layer 606 is composed of a dielectric material. In an embodiment, the insulation layer 606 is solid, and is composed of one or more polymers or polymer composites. Alternatively, the insulation layer 606 may be a liquid or a gas, such as pressurized air.

The conductive shield layer 608 may be a tape, a sleeve, or a paint-like liquid substance that is applied on the insulation layer 606. The conductive shield layer 608 may have a conductivity in a range from $10^3$ Siemens per meter (S/m) down to $10^{-3}$ S/m. In an embodiment, the conductive shield layer 608 is composed of one or more polymer materials that are embedded with conductive particles, such as metal powder, flakes, or threads. For example, the shield layer 608 may be a polyester tape embedded with metal particles. The conductive shield layer 608 is applied directly on the insulation layer 606 such that no air is allowed between the shield layer 608 and the insulation layer 606. The shield layer 608 may provide an air-tight barrier around the stator winding 422.

In an embodiment, the conductive shield layer 608 surrounds the insulation layer 606 along both the in-slot portion 424 and the end-winding portion 426 of the stator winding 422. Therefore, the conductive shield layer 608 is disposed within the slots 416 and is also located outside of the slots 416. In an embodiment, the conductive shield layer 608 surrounds the insulation layer 606 along an entire length of a curved connecting segment 614 of the end-winding portion 426 that extends between two slots 416. The conductive shield layer 608 therefore extends continuously from within one slot 416 along the curved connecting segment 614 into the next slot 416. In the illustrated embodiment, the conductive shield layer 608 surrounds the insulation layer 606 along the entire length of the stator winding 422 within the housing 602. Therefore, the insulation layer 606 is not exposed to the air within the housing 602 along any portion of the stator winding 422. The shield layer 608 on the exit segment 610 may engage the housing 602 at the opening 612 to electrically connect the shield layer 608 to the housing 602, thus providing an electrical grounding path from the shield layer 608 to the housing 602.

In an embodiment, the conductive shield layer 608 also surrounds other insulated components within the housing 602 that may risk corona discharge. For example, the electrical machine 400 may include at least one cooling pipe 626 that extends into the housing 602 and connects to the stator winding 422 at one or more cooling junctions 618 outside of the stator 402. The cooling pipe 626 conveys a cooling fluid in the liquid or gas phase to the stator winding 422 at the cooling junction 618 in order to absorb heat from the stator winding 422. The cooling pipe 626 includes a dielectric tube 628 through which the cooling fluid flows. The dielectric tube 628 is surrounded by the conductive shield layer 608 within the housing 602. The cooling junction 618 between the cooling pipe 626 and the stator winding 422 is also covered in the conductive shield layer 608. Although not shown in FIG. 6, a distal end of the cooling pipe 626 outside of the housing 602 may be connected to a cooling system that supplies the cooling fluid to the pipe 626.

Optionally, the stator winding 422 may be inserted into the stator 402 such that some segments of the stator winding 422 connect to each other at conductor joints 630. The conductive shield layer 608 also can surround the conductor joints 630.

In one embodiment, the stator winding 422 may be similar to, or identical to, the electrical power cables 224 shown in FIG. 2 that extend between the different electrical devices and machines in the electrical propulsion system 206. For example, the power cables 224 may include a core conductor that is surrounded by an insulation layer, which is itself surrounded by a conductive shield layer that suppresses corona discharge. In one embodiment, the stator winding 422 terminates to an electrical power cable 224 within or outside of the housing 602. The conductive shield layer 608 of the stator winding 422 surrounds the interface and also electrically connects to the shield layer of the power cable 224. In an alternative embodiment, the stator winding 422 defines the power cable 224 that extends from the electrical machine 400 to an adjacent electrical device or machine in the electrical propulsion system 206, such that the exit segment 610 extends continuously from the housing 602 to the adjacent electrical device or machine.

Figure 7:
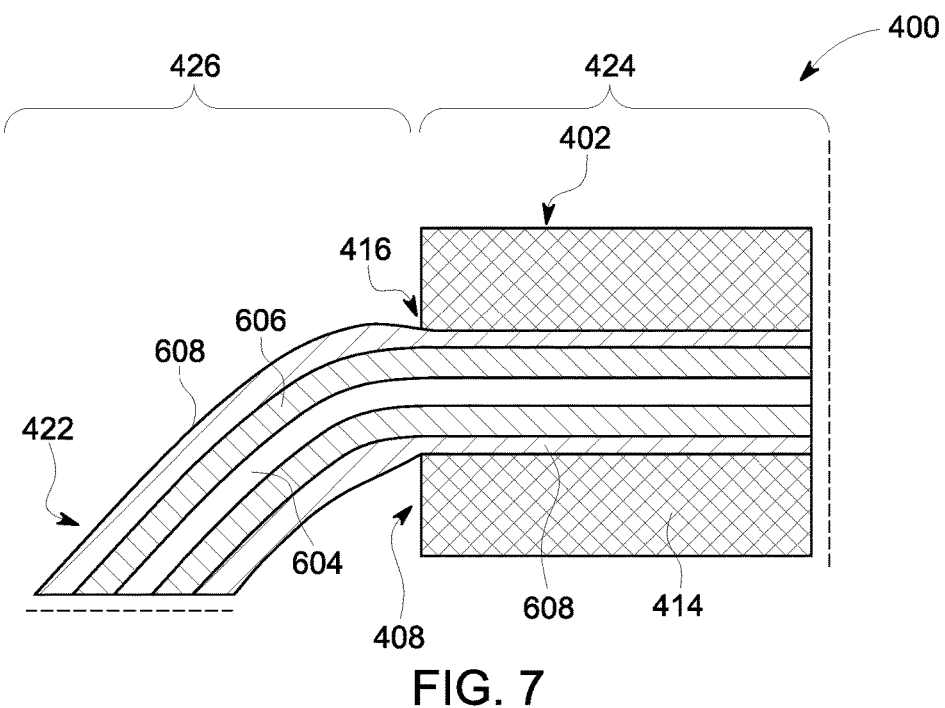
FIG. 7 is a close up view of a portion of the electrical machine according to an embodiment.

FIG. 7 is a close up view of a portion of the electrical machine 400 according to one embodiment. The illustrated portion of the electrical machine 400 shows the stator winding 422 extending from a slot 416 of the stator 402 at the rear 408 of the stator 402. The stator winding 422 shown in FIG. 7 includes both the in-slot portion 424 that is within the slot 416 and the end-winding portion 426 that is outside of the slot 416. In an embodiment, the conductive shield layer 608 of the stator winding 422 engages the slot wall 414 of the stator 402 within the slot 416. The stator 402 is grounded and there is no air within the slot 416 between the shield layer 608 and the slot wall 414. As a result, there is little risk of corona discharge within the stator 402. There is a greater risk of corona discharge outside of the slot 416 along the end-winding portion 426 because the ground plane is spaced apart from the stator winding 422.

In an embodiment, the conductive shield layer 608 has a greater conductivity along the end-winding portion 426 than along the in-slot portion 424. The greater conductivity outside of the stator 402 may provide electrical performance benefits, such as preventing excessive energy losses and/or eddy currents along the end-winding portion 426 of the stator winding 422. The variation in the conductivity of the shield layer 608 may be provided by varying the material properties of the shield layer 608, the thickness of the shield layer 608, and/or the like. For example, the shield layer 608 along the end-winding portion 426 may have a greater concentration of conductive particles than the shield layer 608 along the in-slot portion 424. In the illustrated example, the shield layer 608 has a greater thickness (e.g., defined radially from the insulation layer 606) along the end-winding portion 426 relative to the thickness of the shield layer 608 along the in-slot portion 424. The increased thickness may enhance the conductive property of the shield layer 608. In an alternative embodiment, the conductivity and/or thickness of the shield layer 608 is uniform along both the end-winding portion 426 and the in-slot portion 424.

Figure 8:
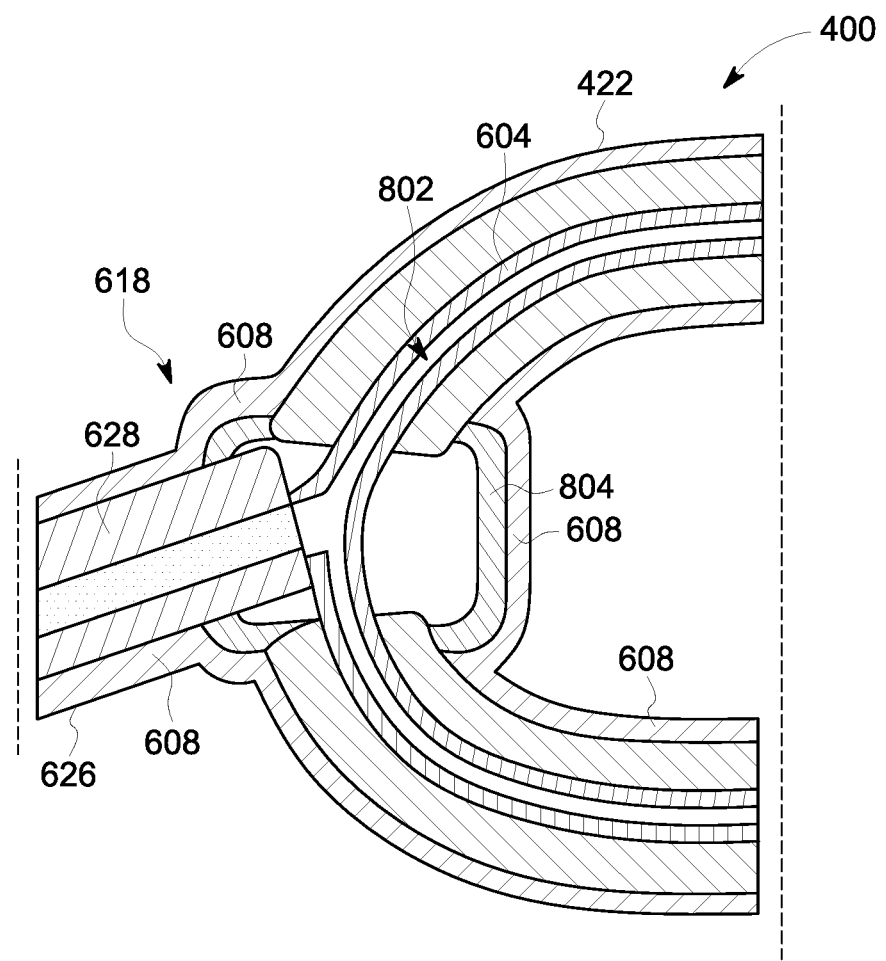
FIG. 8 is a close up cross-sectional view of another portion of the electrical machine according to an embodiment showing a stator winding and a cooling pipe at a cooling junction.

FIG. 8 is a close up cross-sectional view of another portion of the electrical machine 400 according to one embodiment showing the stator winding 422 and the cooling pipe 626 at a cooling junction 618. In an embodiment, the core conductor 604 of the stator winding 422 is hollow and defines a fluid channel 802 therethrough. The fluid channel 802 extends axially along a length of the core conductor 604. The cooling junction 618 includes a dielectric connector housing 804 that connects to ends of both the stator winding 422 and the cooling pipe 626. The dielectric tube 628 is hollow and is fluidly connected to the fluid channel 802 of the core conductor 604 within the connector housing 804. Therefore, a cooling fluid, such as water or oil, can be directed from the dielectric tube 628 into the fluid channel 802 and/or from the fluid channel 802 into the dielectric tube 628 within the connector housing 804. As shown in FIG. 8, the stator winding 422, the cooling pipe 626, and the connector housing 804 are all surrounded by the conductive shield layer 608.

Figure 9:
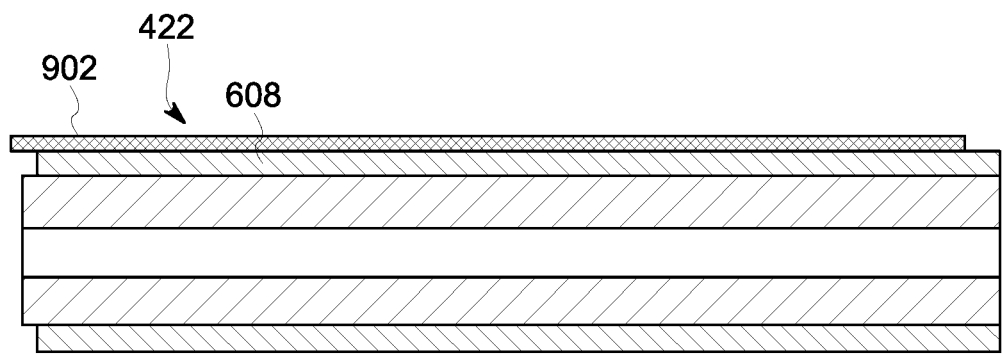
FIG. 9 shows a cross-sectional length of the stator winding of the electrical machine according to an embodiment.
Figure 10:
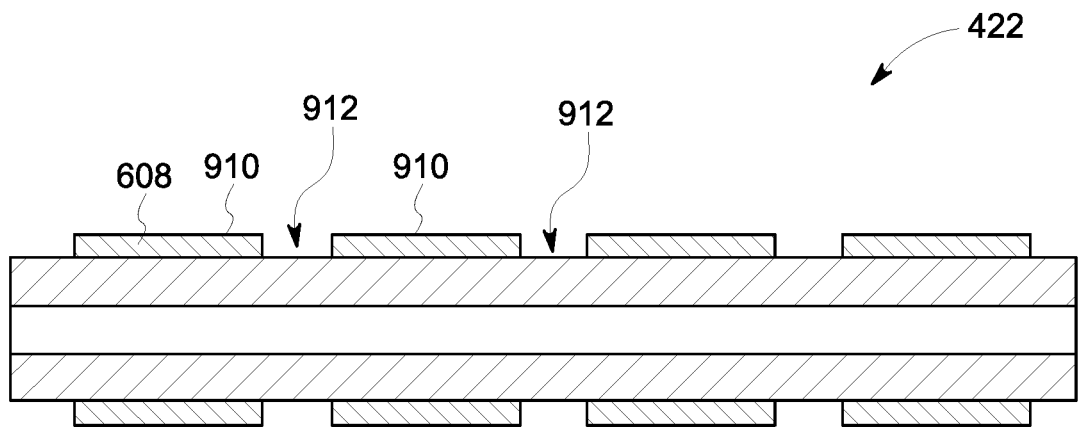
FIG. 10 shows a cross-sectional length of the stator winding of the electrical machine according to an alternative embodiment.
Figure 11:
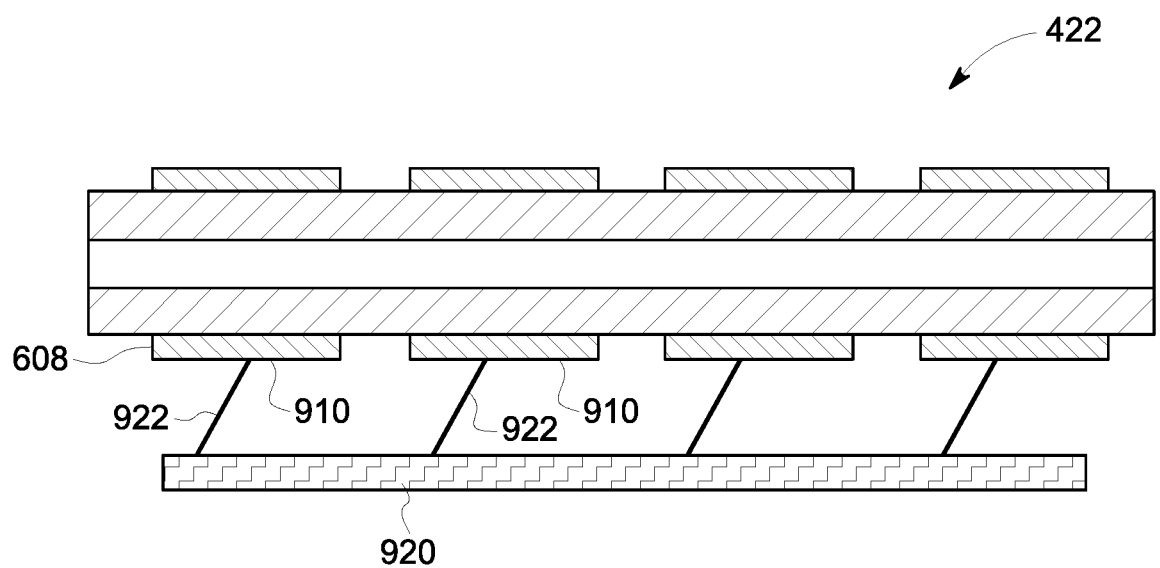
FIG. 11 shows a cross-sectional length of the stator winding of the electrical machine according to another alternative embodiment.

FIGS. 9-11 show cross-sectional lengths of the stator winding 422 of the electrical machine 400 according to various embodiments of the present disclosure. In one embodiment shown in FIG. 9, the conductive shield layer 608 includes no insulative gaps or breaks in conductivity along the entire length of the stator winding 422 within the housing 602 (shown in FIG. 6) of the electrical machine 400. Optionally, the stator winding 422 may include a drain wire 902 that is electrically connected to the conductive shield layer 608 and extends along the length of the stator winding 422. For example, the drain wire 902 in FIG. 9 engages the conductive shield layer 608 directly. The drain wire 902 does not surround the shield layer 608, but rather engages a circumferential portion of the shield layer 608 along the length of the drain wire 902. The drain wire 902 has a high conductivity and is configured to provide a ground path axially along the length of the stator winding 422. The drain wire 902 may be electrically connected to the stator 402 (shown in FIG. 6) or the housing 602. The drain wire 902 is optional, and may be omitted from the stator winding 422 in an alternative embodiment.

FIG. 10 shows an alternative embodiment of the stator winding 422. In FIG. 10, the conductive shield layer 608 is segmented into discrete shield segments 910 that are spaced apart along the length of the stator winding 422 by dielectric gaps 912. Each dielectric gap 912 extends around a full perimeter of the stator winding 422 to electrically insulate (e.g., block electric current flow between) the adjacent shield segments 910 on either side of the dielectric gap 912. In the illustrated embodiment, the dielectric gaps 912 are cut-out portions of the conductive shield layer 608 that are filled by air. Alternatively, the dielectric gaps 912 may be solid annular rings composed of a plastic material. Each dielectric gap 912 has an axial length that is less than 5 mm, such as less than 1 mm. Each shield segments 910 may have a length between about 50 mm and about 500 mm. Therefore, the shield segments 910 are significantly longer than the gaps 912. Insulating the shield segments 910 from one another may improve electrical performance by preventing ground currents formation along the shield layer 608. Ground currents along the shield 608 may cause eddy currents and/or power loss. The shield segments 910 optionally may have different electrical properties, such as different resistances.

FIG. 11 shows another alternative embodiment of the stator winding 422. In FIG. 11, the conductive shield layer 608 is segmented into the discrete shield segments 910, and a drain wire 920 extends along the length of the stator winding 422. Unlike FIG. 9, however, the drain wire 920 is spaced apart from the conductive shield layer 608 and is indirectly electrically connected to the shield layer 608 via tie wires 922. Each tie wire 922 extends between the drain wire 920 and a different one of the shield segments 910. As an alternative to using the tie wires 922, the drain wire 920 may be secured in direct engagement with the shield segments 910 of the shield layer 608, similar to the drain wire 902 shown in FIG. 9.

Figure 12:
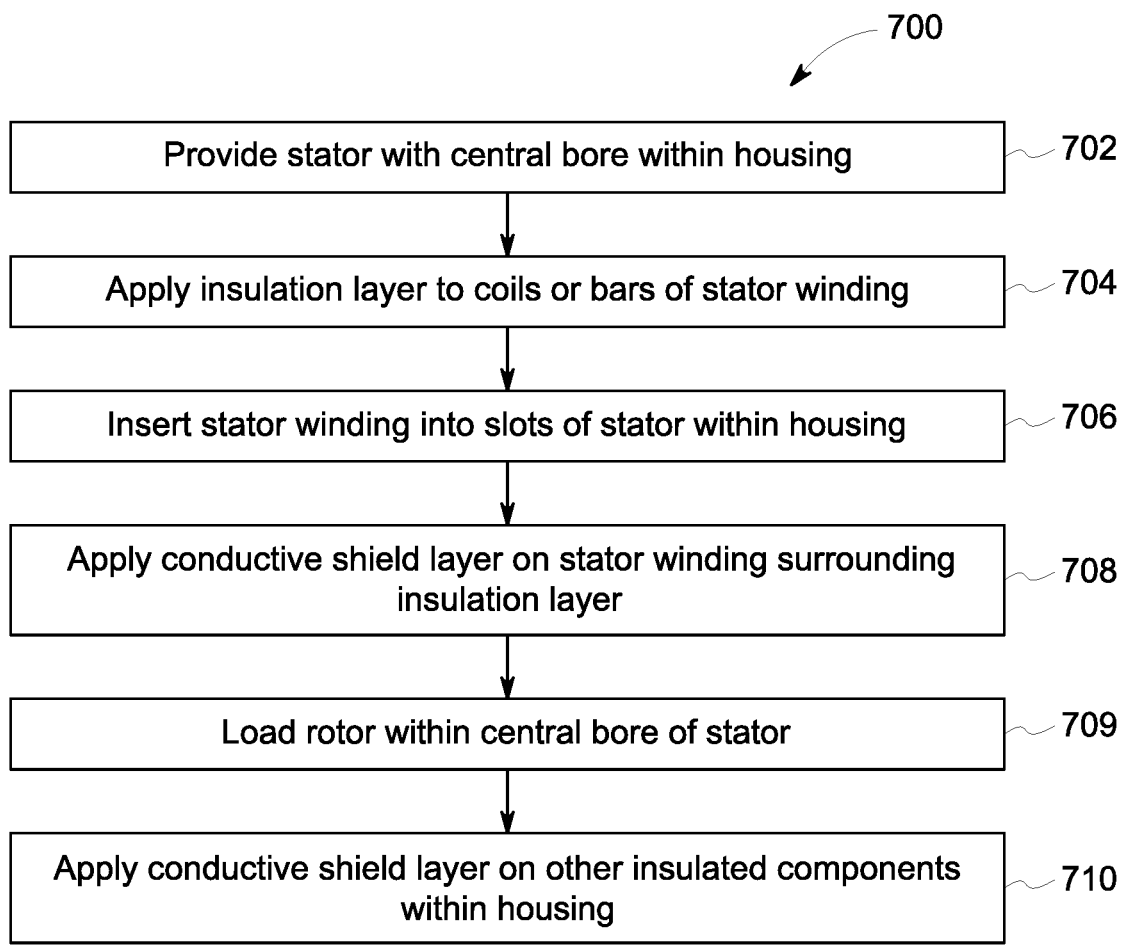
FIG. 12 is a flow chart of a method of assembling an electrical machine according to an embodiment.

FIG. 12 is a flow chart of a method 700 of assembling an electrical machine for a high voltage propulsion system on a vehicle, such as an aircraft, according to one embodiment. The electrical machine may be the electrical machine 400 shown in FIGS. 4-6, and may also represent the generator 212 and/or the motor 222 shown in FIG. 2. At 702, a stator having a central bore is provided within a housing. The stator has an annular shape, and the central bore extends through the stator between a front and a rear thereof along a longitudinal axis. The stator defines slots that are disposed circumferentially around the central bore. The slots are defined by slot walls. The slots extend through the stator from the front to the rear, and may extend parallel to the longitudinal axis.

At 704, an insulation layer is applied to coils or bars of a stator winding. The insulation layer provides a dielectric stress grading material surrounding a core conductor of the stator winding.

At 706, the stator winding is inserted into the slots of the stator within the housing. The stator winding is inserted into the slots such that the stator winding winds continuously through each of the slots in the stator. The stator winding may be inserted into the slots by electrically connecting multiple winding bars together or by winding a single coil through the slots. The stator winding has an in-slot portion that is located within the slots of the stator (e.g., between the front and the rear of the stator) and an end-winding portion that is outside of the slots (e.g., not between the front and the rear of the stator).

At 708, a conductive shield layer is applied on the stator winding that surrounds the insulation layer. The conductive shield layer is applied along both the in-slot portion and the end-winding portion of the stator winding. In an embodiment, the conductive shield layer is applied on the insulation layer after inserting the stator winding into the slots of the stator. Alternatively, the conductive shield layer is applied on the insulation layer prior to inserting the stator winding into the slots. The conductive shield layer may be applied such that the conductive shield layer surrounds the insulation layer along an entire length of the stator winding within the housing. The conductive shield layer may be a tape that is wrapped around the insulation layer, a paint-like substance that is dipped, brushed, or blown onto the insulation layer, or a sleeve that is loaded over the insulation layer. Optionally, the conductive shield layer may be applied such that the conductivity of the conductive shield layer is not uniform along the length. For example, the conductivity and/or thickness of the shield layer may be greater along the end-winding portion than along the in-slot portion.

At 709, a rotor is loaded within the central bore of the stator. The rotor is coupled to a shaft that extends along the longitudinal axis. The rotor is configured to rotate relative to the stator around the longitudinal axis.

At 710, the conductive shield layer is optionally applied on other insulated components within the housing that may be susceptible to corona discharge. For example, the conductive shield layer may be applied on cooling pipes, connectors, and the like.

In an embodiment, an electrical machine of a vehicle electrical propulsion system is provided that includes a housing, a stator, a rotor, and a stator winding. The stator is within the housing, and has an annular shape that defines a central bore elongated along a longitudinal axis of the stator. The stator defines slots circumferentially disposed around the central bore. The rotor is held within the central bore of the stator. The rotor is coupled to a shaft that extends along the longitudinal axis of the stator. The rotor is configured to rotate relative to the stator around the longitudinal axis. The stator winding extends through the slots of the stator within the housing. The stator winding includes a core conductor, an insulation layer surrounding the core conductor, and a conductive shield layer surrounding the insulation layer. The stator winding includes an in-slot portion within the slots of the stator and an end-winding portion outside of the slots. The conductive shield layer surrounds the insulation layer of the stator winding along both the in-slot portion and the end-winding portion of the stator winding.

Optionally, the conductive shield layer of the stator winding has a greater conductivity along the end-winding portion than along the in-slot portion.

Optionally, the conductive shield layer of the stator winding has a greater thickness along the end-winding portion than along the in-slot portion.

Optionally, the core conductor of the stator winding is hollow and defines a fluid channel therethrough for cooling the core conductor.

Optionally, the electrical machine further includes a cooling pipe extending into the housing and connecting to the stator winding at a cooling junction outside of the stator within the housing. The cooling pipe includes a dielectric tube that is surrounded by the conductive shield layer. The dielectric tube is fluidly connected to the fluid channel of the core conductor at the cooling junction and is configured to convey a cooling fluid into the fluid channel.

Optionally, the housing is electrically conductive. The stator winding has an exit segment that extends through an opening in the housing. The shield layer of the stator winding engages the housing at the opening to electrically connect the shield layer to the housing.

Optionally, the shield layer surrounds the insulation layer along an entire length of the stator winding within the housing.

Optionally, the shield layer of the stator winding is segmented into discrete shield segments along a length of the stator winding. Adjacent shield segments are separated from each other by a dielectric gap extending around a full perimeter of the stator winding to block electric current flow between the adjacent shield segments.

Optionally, the stator winding includes a drain wire extending a length of the stator winding. The drain wire is spaced apart from the shield segments of the stator winding and is electrically connected to the shield segments via corresponding tie wires. Each tie wire extends between the drain wire and a different one of the shield segments.

Optionally, the stator winding includes a drain wire extending a length of the stator winding. The drain wire engages the shield layer of the stator winding directly.

In an embodiment, a propulsion system of a vehicle is provided that includes an engine and an electrical propulsion system operably coupled to the engine. The electrical propulsion system includes an electrical machine. The electrical machine includes a housing, a stator, a rotor, and a stator winding. The stator is within the housing, and has an annular shape that defines a central bore elongated along a longitudinal axis of the stator. The stator defines slots circumferentially disposed around the central bore. The rotor is held within the central bore of the stator. The rotor is coupled to a shaft that extends along the longitudinal axis of the stator. The rotor is configured to rotate relative to the stator around the longitudinal axis. The stator winding extends through the slots of the stator within the housing. The stator winding includes a core conductor, an insulation layer surrounding the core conductor, and a conductive shield layer surrounding the insulation layer. The stator winding includes an in-slot portion within the slots of the stator and an end-winding portion outside of the slots. The conductive shield layer surrounds the insulation layer of the stator winding along both the in-slot portion and the end-winding portion of the stator winding.

Optionally, the electrical machine is a generator, and the shaft of the rotor is mechanically coupled to a drive shaft of the engine. Rotation of the drive shaft causes the rotor to rotate within the central bore of the stator. The rotation of the rotor generates an electric current within the stator winding.

Optionally, the electrical propulsion system further includes a power converter electrically connected to the electrical machine via an electrical power cable that extends between the housing of the electrical machine and a housing of the power converter. The electrical power cable includes a core conductor, an insulation layer surrounding the core conductor, and a cable shield layer surrounding the insulation layer along an entire length of the electrical power cable between the electrical machine and the power converter.

Optionally, the electrical machine is a motor, and the shaft of the rotor is mechanically coupled to a propeller on the vehicle. An electric current conveyed along the core conductor of the stator winding induces a magnetic field that rotates the rotor within the central bore of the stator, causing the shaft to rotate the propeller.

Optionally, the conductive shield layer of the stator winding has a greater conductivity along the end-winding portion than along the in-slot portion.

Optionally, the conductive shield layer of the stator winding has a greater thickness along the end-winding portion than along the in-slot portion.

Optionally, the core conductor of the stator winding is hollow and defines a fluid channel therethrough for cooling the core conductor.

In an embodiment, a method is provided that includes providing a stator within a housing. The stator has an annular shape that defines a central bore elongated along a longitudinal axis of the stator. The stator defines slots circumferentially disposed around the central bore. The method includes inserting a stator winding into the slots of the stator within the housing. The stator winding includes a core conductor and an insulation layer surrounding the core conductor. The stator winding has an in-slot portion within the slots of the stator and an end-winding portion outside of the slots. The method also includes applying a conductive shield layer that surrounds the insulation layer of the stator winding. The conductive shield layer is applied along both the in-slot portion and the end-winding portion of the stator winding.

Optionally, the conductive shield layer is applied such that the conductive shield layer surrounds the insulation layer along an entire length of the stator winding within the housing.

Optionally, the conductive shield layer is applied such that a conductivity of the conductive shield layer is greater along the end-winding portion than along the in-slot portion.

Optionally, the method also includes loading a rotor within the central bore of the stator. The rotor is coupled to a shaft that extends along the longitudinal axis of the stator. The rotor is configured to rotate relative to the stator around the longitudinal axis.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. For example, this written description shows a rotor inside of a stator, but in other embodiments the rotor may be outside of the stator. This written description discloses a radial flux machine as a non-limiting example embodiment of an electrical machine, but in other embodiments the electrical machine may be an axial flux machine. Furthermore, this written description discloses a slotted stator as a non-limiting example embodiment of an electrical machine, but in other embodiments the electrical machine may have an airgap winding.

What is claimed is:

1. An electrical machine of a vehicle electrical propulsion system, the electrical machine comprising:
    a housing;
    a stator within the housing, the stator having an annular shape that defines a central bore elongated along a longitudinal axis of the stator, the stator defining slots circumferentially disposed around the central bore;
    a rotor held within the central bore of the stator, the rotor coupled to a shaft that extends along the longitudinal axis of the stator, the rotor configured to rotate relative to the stator around the longitudinal axis; and
    a stator winding extending through the slots of the stator within the housing, the stator winding including a core conductor, an insulation layer surrounding the core conductor, and a conductive shield layer surrounding the insulation layer, the stator winding including an in-slot portion within the slots of the stator and an end-winding portion outside of the slots,
    wherein the conductive shield layer is electrically conductive and surrounds the insulation layer of the stator winding along both the in-slot portion and the end-winding portion of the stator winding, wherein the conductive shield layer has a greater electrical conductivity along the end-winding portion than along the in-slot portion.

2. The electrical machine of claim 1, wherein the conductive shield layer of the stator winding has a greater thickness along the end-winding portion than along the in-slot portion.

3. The electrical machine of claim 1, wherein the core conductor of the stator winding is hollow and defines a fluid channel therethrough for cooling the core conductor.

4. The electrical machine of claim 3, further comprising a cooling pipe extending into the housing and connecting to the stator winding at a cooling junction outside of the stator within the housing, the cooling pipe including a dielectric tube that is surrounded by the conductive shield layer, the dielectric tube fluidly connected to the fluid channel of the core conductor at the cooling junction and configured to convey a cooling fluid into the fluid channel.

5. The electrical machine of claim 1, wherein the housing is electrically conductive, the stator winding having an exit segment that extends through an opening in the housing, the conductive shield layer of the stator winding engaging the housing at the opening to electrically connect the conductive shield layer to the housing.

6. The electrical machine of claim 1, wherein the conductive shield layer surrounds the insulation layer along an entire length of the stator winding within the housing.

7. The electrical machine of claim 1, wherein the conductive shield layer of the stator winding is segmented into discrete shield segments along a length of the stator winding, adjacent shield segments being separated from each other by a dielectric gap extending around a full perimeter of the stator winding to block electric current flow between the adjacent shield segments.

8. The electrical machine of claim 7, wherein the stator winding includes a drain wire extending a length of the stator winding, the drain wire spaced apart from the shield segments of the stator winding and electrically connected to the shield segments via corresponding tie wires, each tie wire extending between the drain wire and a different one of the shield segments.

9. The electrical machine of claim 1, wherein the stator winding includes a drain wire extending a length of the stator winding, the drain wire directly engaging with the conductive shield layer of the stator winding.

10. The electrical machine of claim 1, wherein the end-winding portion of the stator winding includes a curved connecting segment that extends from one of the slots to another of the slots, and the conductive shield layer surrounds the insulation layer of the stator winding along an entire length of the curved connecting segment of the end-winding portion.

11. A propulsion system of a vehicle, the propulsion system comprising:
    an engine; and
    an electrical propulsion system operably coupled to the engine, the electrical propulsion system including an electrical machine comprising:
    a housing;
    a stator within the housing, the stator having an annular shape that defines a central bore elongated along a longitudinal axis of the stator, the stator defining slots circumferentially disposed around the central bore;
    a rotor held within the central bore of the stator, the rotor coupled to a shaft that extends along the longitudinal axis of the stator, the rotor configured to rotate relative to the stator around the longitudinal axis; and
    a stator winding extending through the slots of the stator within the housing, the stator winding including a core conductor, an insulation layer surrounding the core conductor, and a conductive shield layer surrounding the insulation layer, the stator winding including an in-slot portion within the slots of the stator and an end-winding portion outside of the slots, wherein the end-winding portion of the stator winding includes a curved connecting segment that extends from one of the slots to another of the slots,
    wherein the conductive shield layer is electrically conductive and surrounds the insulation layer of the stator winding along the in-slot portion and along an entire length of the curved connecting segment of the end-winding portion.

12. The propulsion system of claim 11, wherein the electrical machine is a generator, the shaft of the rotor mechanically coupled to a drive shaft of the engine, wherein rotation of the drive shaft causes the rotor to rotate within the central bore of the stator, the rotation of the rotor generating an electric current within the stator winding.

13. The propulsion system of claim 11, wherein the electrical propulsion system further includes a power converter, the power converter electrically connected to the electrical machine via an electrical power cable that extends between the housing of the electrical machine and a housing of the power converter, the electrical power cable including a core conductor, an insulation layer surrounding the core conductor, and a cable shield layer surrounding the insulation layer along an entire length of the electrical power cable between the electrical machine and the power converter.

14. The propulsion system of claim 11, wherein the electrical machine is a motor, the shaft of the rotor mechanically coupled to a propeller on the vehicle, wherein an electric current conveyed along the core conductor of the stator winding induces a magnetic field that rotates the rotor within the central bore of the stator, causing the shaft to rotate the propeller.

15. The propulsion system of claim 11, wherein the conductive shield layer of the stator winding has a greater electrical conductivity along the end-winding portion than along the in-slot portion.

16. The propulsion system of claim 11, wherein the conductive shield layer of the stator winding has a greater thickness along the end-winding portion than along the in-slot portion.

17. The propulsion system of claim 11, wherein the core conductor of the stator winding is hollow and defines a fluid channel therethrough for cooling the core conductor.

18. A method comprising:
providing a stator within a housing, the stator having an annular shape that defines a central bore elongated along a longitudinal axis of the stator, the stator defining slots circumferentially disposed around the central bore;

inserting a stator winding into the slots of the stator within the housing, the stator winding including a core conductor and an insulation layer surrounding the core conductor, the stator winding having an in-slot portion within the slots of the stator and an end-winding portion outside of the slots; and applying a conductive shield layer that surrounds the insulation layer of the stator winding, wherein the conductive shield layer is electrically conductive and is applied along both the in-slot portion and the end-winding portion of the stator winding, wherein the conductive shield layer is applied such that an electrical conductivity of the conductive shield layer is greater along the end-winding portion than along the in-slot portion.

19. The method of claim 18, wherein the conductive shield layer is applied such that the conductive shield layer surrounds the insulation layer along an entire length of the stator winding within the housing.

20. The method of claim 18, further comprising loading a rotor within the central bore of the stator, the rotor coupled to a shaft that extends along the longitudinal axis of the stator, the rotor configured to rotate relative to the stator around the longitudinal axis.

21. The method of claim 18, wherein the conductive shield layer is applied such that a thickness of the conductive shield layer is greater along the end-winding portion than along the in-slot portion.

* * * * *

UNITED STATES PATENT AND TRADEMARK OFFICE
CERTIFICATE OF CORRECTION

| | | |
|---|---|---|
| PATENT NO. | : 10,992,201 B2 | Page 1 of 1 |
| APPLICATION NO. | : 15/670584 | |
| DATED | : April 27, 2021 | |
| INVENTOR(S) | : Calebrese et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 764 days.

Signed and Sealed this
Seventh Day of February, 2023

Katherine Kelly Vidal
*Director of the United States Patent and Trademark Office*